United States Patent
Lundy et al.

(10) Patent No.: US 8,037,511 B1
(45) Date of Patent: Oct. 11, 2011

(54) UTILIZING A MOBILE DEVICE TO OPERATE AN ELECTRONIC LOCKING MECHANISM

(75) Inventors: Michael T. Lundy, Olathe, KS (US); Jason K. Whitney, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 1065 days.

(21) Appl. No.: 11/851,949

(22) Filed: Sep. 7, 2007

Related U.S. Application Data

(63) Continuation-in-part of application No. 11/781,040, filed on Jul. 20, 2007.

(51) Int. Cl.
| | |
|---|---|
| *G06F 7/04* | (2006.01) |
| *G06F 12/00* | (2006.01) |
| *H04M 11/00* | (2006.01) |
| *H04M 1/00* | (2006.01) |
| *G08B 21/00* | (2006.01) |
| *G07C 9/00* | (2006.01) |
| *G07F 17/12* | (2006.01) |
| *E05B 47/02* | (2006.01) |

(52) U.S. Cl. ....... 726/3; 726/5; 726/6; 726/21; 713/186; 455/421; 455/567; 340/686.6

(58) Field of Classification Search ............. 726/3, 5, 726/6, 21; 713/186; 455/567, 421
See application file for complete search history.

(56) References Cited

U.S. PATENT DOCUMENTS
| | | | |
|---|---|---|---|
| 6,615,253 B1 | 9/2003 | Bowman-Amuah | |
| 7,552,467 B2 * | 6/2009 | Lindsay | 726/5 |
| 2006/0224901 A1 * | 10/2006 | Lowe | 713/186 |
| 2007/0037566 A1 * | 2/2007 | D'Agostino et al. | 455/421 |
| 2009/0158032 A1 | 6/2009 | Costa et al. | |

FOREIGN PATENT DOCUMENTS
| | | |
|---|---|---|
| WO | WO 2007123554 A1 * | 11/2007 |

OTHER PUBLICATIONS

Kyungwhan Park; Gun Il Ma; Jeong Hyun Yi; Youngseob Cho; Sangrae Cho; Sungeun Park; "Smartphone remote lock and wipe system with integrity checking of SMS notification"; Consumer Electronics (ICCE), 2011 IEEE International Conference on Digital Object Identifier: Publication Year Jul. 2011, pp. 263-264.*
Office Action in U.S. Appl. No. 11/781,040 mailed Sep. 14, 2010.

* cited by examiner

*Primary Examiner* — Eleni Shiferaw
*Assistant Examiner* — Courtney Fields

(57) ABSTRACT

One or more media is provided for performing a method of operating an electronic locking mechanism. Initially, a request from a requesting mobile device is received at a computing device via a sensing device. The request includes an identifier utilized in an initial validation sequence having the following steps: identifying a device identity according to the identifier, transmitting the device identity with a request that a message be communicated to a target mobile device, and determining validation data. Upon receiving the request, a communications network identifies the target mobile device, based on the device identity, and communicates a message with validation data therein. The mobile device conveys authentication information to the computing device, where the authentication information is based on the validation data. The computing device compares the authentication information against the determined validation data to determine whether the targeted mobile device is authorized to operate the electronic locking mechanism.

14 Claims, 13 Drawing Sheets

UTILIZING A MOBILE DEVICE TO OPERATE AN ELECTRONIC LOCKING MECHANISM

CROSS-REFERENCE TO RELATED APPLICATIONS

This application is a continuation-in-part of U.S. patent application Ser. No. 11/781,040, filed Jul. 20, 2007, the entire disclosure of which is hereby incorporated by reference.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the invention provide computer-readable media for, among other things, performing a method for operating an electronic locking mechanism by way of utilizing a mobile device, or by leveraging the technologies associated with targeting the mobile device to communicate a message thereto via a secured pathway in connection with communications-network infrastructure. Embodiments have several practical applications in the technical arts, including utilizing a communications network to identify the target mobile device and provide a message to the target device that may be relayed to an authentication application coupled to an electronic locking mechanism. Accordingly, the authentication application may validate the targeted mobile device based on authentication information within the message and permit operation of the electronic locking mechanism. The electronic locking mechanism can be used in connection with a house door, car door, gate, magnet, or any other physical structure that is meant to limit access to something. The user in possession of the mobile device is identified via the targeted mobile device and is allowed to gain access if certain security credentials are validated or processes complied with.

Embodiments generally relate to operating an electronic locking mechanism. More particularly, a first aspect of an embodiment is directed to a request that includes an identifier received from a requesting mobile device. A determination of whether the requesting mobile device is authorized to operate the electronic locking mechanism is performed. The determination includes at least the following steps: identifying the target mobile device based on the identifier, determining validation data, and requesting that a message be communicated to the target mobile device. Incident to receiving authentication information from the target mobile device—where the authentication information is generated, in part, according to the message—validation procedures are conducted at the computing device.

In a second aspect, embodiments are directed toward computer-readable media for performing a method to operate an electronic locking mechanism. Initially, a request to operate the electronic locking mechanism is communicated by a mobile device. In one embodiment, the request identifies the mobile device. A message is received by way of a communications network, where the message is based on the request. Incident to receiving the message, the mobile device communicates authentication information derived, in part, from the message. In one embodiment, upon inputting the authentication into a validation procedure, the mobile device is determined valid thereby authorizing the mobile device to operate the electronic locking mechanism. Alternatively, a determination that the authentication information is invalid indicates that mobile device may not operate the electronic locking mechanism.

A further aspect of an embodiment takes the form of a set of computer-useable instructions embodied on computer-readable media for operating an electronic locking mechanism. Initially, a command and an identifier associated with a mobile device are received at a computing device that incidentally requests that a communications network transmit a message to the mobile device. In one embodiment, a message is transmitted if the mobile device is identified by the identifier. The computing device receives from the mobile device a first access code, as part of the message communicated to the mobile device, and, from the communications network, a second access code. A validation procedure is then performed that includes comparing the first access code with the second access code. If the first access code matches the second access code, permission to control the electronic locking mechanism is granted to the mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
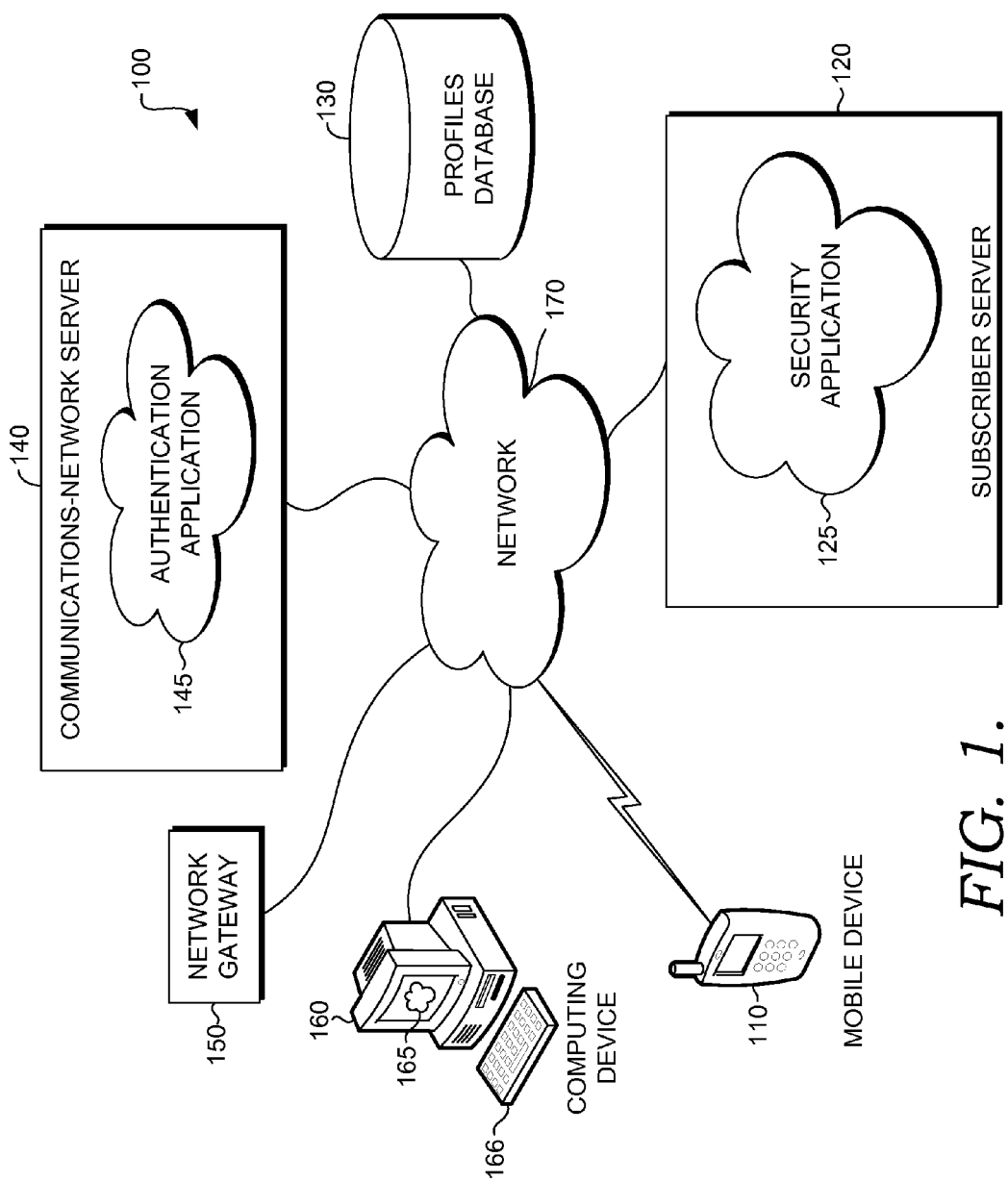
FIG. 1 is a block diagram of an exemplary system architecture suitable for use in implementing embodiments of the present invention.

Embodiments provide systems and methods for providing a user access to a secured portion of a website by authenticating a mobile device. Providing security on websites is useful to help safeguard the viewing and dissemination of confidential information (e.g., bank accounts, identification information, addresses) related to users of a server, where the server has a secured portion with restricted access. One measure of security is based upon the user providing security information, or user credentials, that are specific to a particular user. One form of security information is information associated with a user's mobile device that may be used similar to a key to grant a user in possession of the mobile device access to the secured portion of the website. By simply having the mobile device in proximity to the user while attempting to acquire access at the user interface, the server may authenticate the mobile device and utilize the authentication as user validation.

Other embodiments provide systems and methods for utilizing a mobile device to operate an electronic locking mechanism. Providing an electronic locking mechanism is useful to help disallow public access beyond a certain physical structure (e.g., house door, gate, car door, etc.), or limit those who are authorized to control such physical structure. However, access and/or control may be granted only to a user in possession of a mobile device that is authorized upon satisfying validation procedures. The validation procedures provide a measure of security that is reinforced by the secured pathways within an infrastructure of a communications network. In particular, the validation procedures are triggered by a request from a mobile device and include the following steps: identifying a target mobile device based on the request, requesting that a message be communicated via the secured pathway(s) to the target mobile device, and receiving from the target mobile device authentication information. Accordingly, the authentication information is either determined valid, whereby granting permission to operate the electronic locking mechanism, or invalid.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CDMA | Code Division Multiple Access |
| ESN | Electronic Serial Number |
| GPS | Global Positioning System |
| LANs | Local Area Networks |
| MIN | Mobile Identification Number |
| MMS | Multimedia Message Service |
| MSID | Mobile Station Identification |
| NFC | Near-Field Communication |
| PDA | Personal Digital Assistant |
| PIN | Personal Identification Number |
| SMS | Short Message Service |
| USB | Universal Serial Bus |
| WANs | Wide Area Networks |

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate that embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for validating access information against a set of security credentials to verify the identity of a user in order to grant access to a "secured portion of a website" or other "digitally secured information." A secured portion of a website refers to information restricted from access by one or more security measures (i.e., layers of security). In an exemplary embodiment, a secured portion of a website resides on a subscriber server, where the subscriber server determines whether to grant a user access upon receiving a request for access. In another embodiment, the secured portion of the website includes any information related to a user, user accounts with the subscriber, or data that the user desires to be protected. By way of example, the secured portion of a website is a user's bank account information, as more fully discussed below with reference to FIGS. 7 and 8. Digitally secured information refers to any protected information (e.g., user accounts, addresses, or other data). In an exemplary embodiment, the digitally secured information resides on a subscriber server. By way of example, the digitally secured information is located on the secured portion of the website (that is, accessible via the website after some set of security measures have been satisfied). Although two examples are discussed above, other embodiments contemplate holding other types of digitally secured information on other computing devices that can store or transmit data.

Generally, some aspects of granting access to a user are directed toward determining the identity of a user by validating a set of security credentials upon receiving a user request to access the digitally secure information. Validating includes determining whether a "set of network-authentication procedures" are satisfied. The set of network-authentication procedures refer to steps taken by a communications network to authenticate a mobile device that transmits a communication (e.g., a voice call, IM, text message, etc.) to a communications network. In one embodiment, these procedures are satisfied by authenticating a mobile device incident to the user utilizing the mobile device to transmit a communication to a communications network. In another embodiment, the set of network-authentication procedures is satisfied by the user consuming a communication that is transmitted from the communications network to the user's mobile device.

In an exemplary embodiment, the set of network-authentication procedures include conveying to the user a "dial-in number." As discussed herein, dial-in numbers are phone numbers, or short codes, entered into a mobile device, and used in connection with helping to identify the calling party. In one instance, the dial-in number is provided by a communications-network server to a subscriber for presentation to the user at a user interface of a computing device. In another instance, the dial-in number is conveyed from the communications-network server to the user's mobile device. These instances are discussed with more particularity below. As an additional measure of security, a plurality of dial-in numbers may be established for a particular subscriber and provided thereto in a randomized manner at varying or fixed time intervals.

An illustrative network authentication procedure is determining the authenticity of a mobile device based, at least in part, upon a "device identifier." A device identifier refers to an indicator appended to, or embedded within, or communicated from, a mobile device that uniquely identifies the transmitting mobile device. In embodiments, the device identifier is an electronic serial number (ESN), a mobile station identification (MSID), or another mobile device attribute that is specific to the mobile device. In embodiments, a representation of the device identifier is sent instead of the actual credential so as to add another layer of security. Where we say "device identifier," we mean to refer to the device identifier or representation thereof, although we may not expressly say so in each circumstance.

A mobile identification number (MIN) or a caller identification (caller ID) number certainly may be used, but they are relatively easier to reproduce by an unauthorized user. In one embodiment, device identifiers are provisioned into the mobile device upon activation. In this instance, a communications-network server, a database, or a gateway on the network stores the device's identifying data (e.g., credentials) in association with other user information. Such other information may be useful for facilitating other processes, such as those in connection with billing. By way of example, the device identifier forms part of the security credentials that should be satisfied before granting access to a secured portion of the website.

"Security credentials" refer to data related to a user that can be used to identify that user and to verify the user's right to access certain digitally secured information. They are compared against known-valid access information in one embodiment. In another embodiment, the set of security credentials may include one or more of the following: a personal identification number (PIN), rotating password(s), user-login name, device identifiers of a mobile device, specific message (e.g., mother's maiden name), or any other data, which is normally predetermined data. In one embodiment, the set of security credentials is stored in association with user indicia (e.g., customer name, phone number, or other unsecured user identifiers) at a user profile. In one instance, the security credentials include user information provided by the user of the subscriber server. In another instance, the security credentials may be generated by the subscriber. In operation, the set of security credentials is validated prior to permitting a requesting user access to secured information.

Referring to the drawings in general, and initially to FIG. 1 in particular, a block diagram of an exemplary operating environment is shown and designated generally as computing system 100 configured to provide a user access to a secured portion of a website by authenticating a mobile device.

Illustrative computing system 100 includes, in one embodiment, a mobile device 110, a subscriber server 120, a profiles database 130, a communications-network server 140, a network gateway 150, and a computing device 160 all in communication with one another via a network 170 (which may actually be multiple networks). Although the various components of FIG. 1 are shown with lines for the sake of clarity, in reality, delineating various components is not so clear, and metaphorically, the lines would more accurately be grey or fuzzy.

Further, although some components of FIG. 1 are depicted as single blocks, the depictions are exemplary in nature and in number and are not to be construed as limiting (e.g., although only one mobile device 110 is show, many more may be operably coupled to network 170). Network 170 couples components 110, 120, 130, 140, 150, and 160 (wired, wirelessly, or a combination thereof).

Mobile device 110 is configured to transmit a communication, discussed more fully above, to network 170. In addition, mobile device 110 may be any type of device having communications capability. Mobile device 110 may be, or variously referred to as, a handheld device, mobile handset, consumer electronics device, cell phone, personal digital assistant (PDA) unit, and the like. In addition, each mobile device 110 is provisioned with a device identifier (which may be made up of multiple informational components) that uniquely identifies the device to network 170 in one embodiment. In one embodiment, the device identifier, as more fully discussed above, is embedded in or appended to each communication transmitted from the mobile device. In another embodiment, the device identifier is determined at the commencement or ending of a data-communication session (such as a phone call or messaging communication).

Each of subscriber server 120, profiles database 130, communications-network server 140, network gateway 150, and computing device 160 shown in FIG. 1 may take the form of various types of computing devices. By way of example only, components 120, 130, 140, 150, and 160 may be a personal computing device, handheld device, consumer electronic device, and the like. Additionally, computing device 160 is configured to present a user interface 165 and even to receive input at an input component 166 in one embodiment. User interface 165 may be presented on any presentation component (not shown) that may be capable of presenting information to a user. In an exemplary embodiment, user interface 165 presents a prompt for the user to provide an input (e.g., message, personal identifier, password, etc.) into an input-entry area.

Input component 166 allows a user to provide input to computing device 160. In an exemplary embodiment, the user may utilize input component 166 to provide access information (e.g., message, personal ID, password, etc.) to subscriber server 120.

Returning to FIG. 1, subscriber server 120 protects secure information of a user (e.g., customer) of a subscriber. Subscriber server 120 includes a security application 125 that is configured to grant access to such information upon validating a set of security credentials specific to the user. Validating is accomplished by performing a procedure. The procedure includes a variety of steps aimed at verifying the identity of the user requesting access. In one step, security application 125 establishes a user profile having a set of security credentials stored therein. As more fully discussed above, a user profile associates security credentials to user indicia. In another step, security application 125 receives a request to access the digitally secured information (e.g., at a secured portion of a website). In yet another step, security application 125 initiates a request to validate the set of security credentials, incident to receiving a request for access from a user. In still another step, access of the digitally secured information is granted. In one embodiment, access is granted if communications-network server 140 determines the device identifiers embedded in a mobile-device communication are authentic and the set of security credentials is satisfied by the received access information. Accordingly, the user is granted rights to view and/or manipulate information previously shielded by subscriber server 120. Alternatively, security application 125 may withhold from the user, rights to access at least a portion of the digitally secured information if any one of the set of security credentials is left unsatisfied, subscriber server 120. These steps of the procedure for validating the set of security credentials may be also be performed at any other component operably coupled to communications network 170.

The profiles database 130 stores information associated with a subscriber of the services of the communications network and is searchable for such information. In one embodiment, a subscriber profile is generated where information is associated with, or mapped to, a subscriber that utilizes communications network 170 to authenticate user mobile devices. In this embodiment, the associated information may include, for example, indicia of the subscriber, device identifiers associated with user mobile devices, dial-in numbers (discussed above), or any other data that relates to a subscriber or a customer thereof. Typically, the subscriber profile and information therein are accessible to the communications-network server 140; however, it is contemplated that any of the components 110, 120, 150, and 160 may have limited access to information residing within profiles database 130.

Communications-network server 140 is a computing device in the communications network that is configured to perform a variety of functions in one embodiment. One of these functions includes receiving a request from subscriber server 120 to establish a subscriber profile. Another of these functions includes providing a dial-in number to the subscriber server 120. Yet another of these functions includes utilizing network-authentication procedures to authenticate mobile device 110. One or more of these functions may be carried out by an authentication application 145.

Authentication application 145 resides, at least in part, on communications-network server 140 and may be particularly configured to authenticate mobile device 110 based on information provided by mobile device 110 and embedded within the transmission to the communications network. Typically, the information relied upon for authentication includes a device identifier provisioned on the mobile device. Illustrative examples of security credentials include an ESN, an MSID, and other identifying indicia, as more fully discussed above.

Network gateway 150 assists in authenticating the mobile device upon a user attempting to call the dial-in number. In one embodiment, network gateway 150 gleans mobile-device information (e.g., device identifier) from a call to the communications network. This embodiment is discussed more fully below with reference to FIG. 2.

Figure 2:
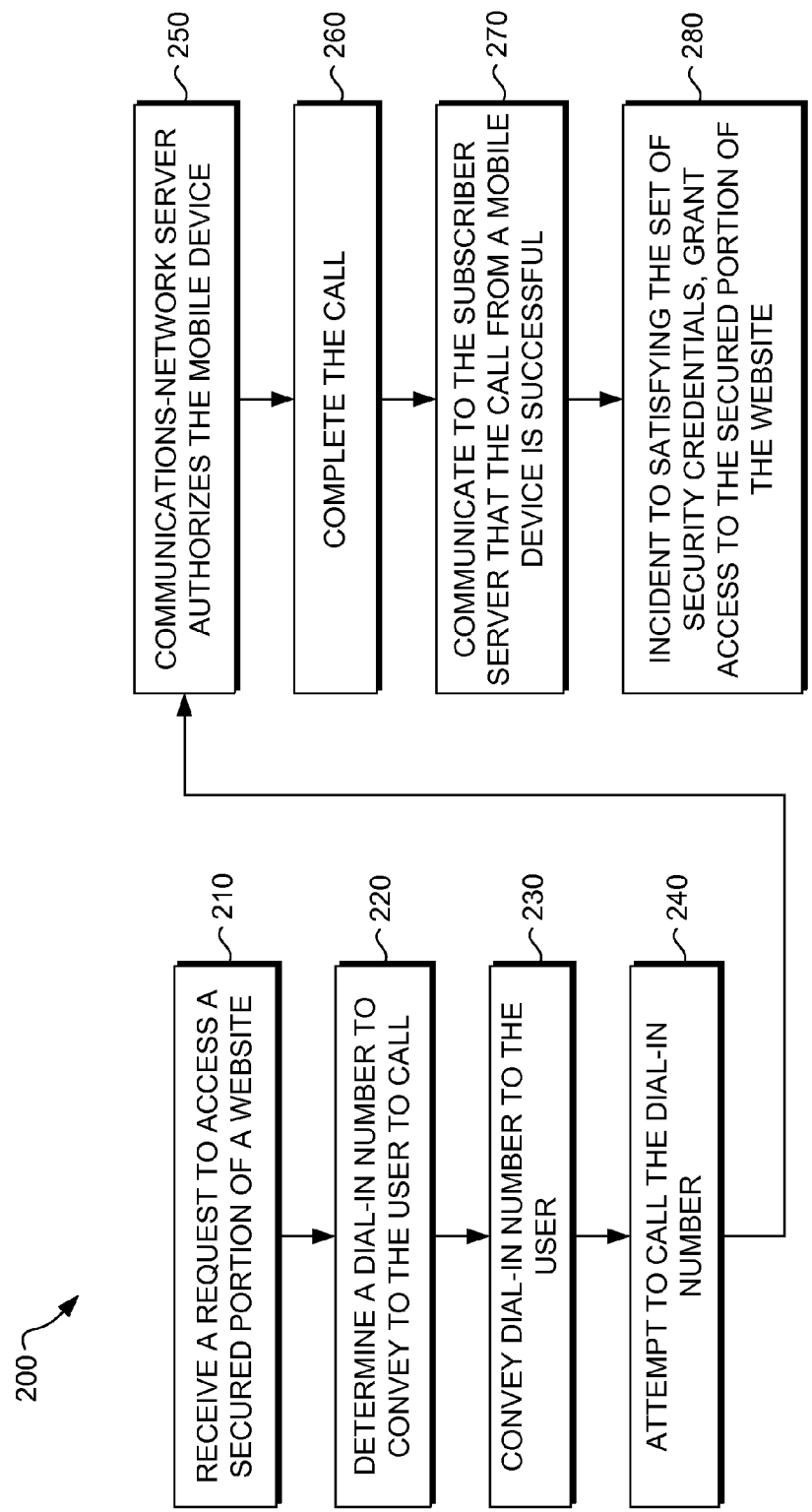
FIG. 2 is a flow diagram showing an overall method for verifying the identity of a user by authenticating a mobile device associated with that user, in accordance with an embodiment.

Turning now to FIG. 2, a flow diagram illustrates overall method 200 for identifying a user by authenticating a mobile device associated with that user, in accordance with an embodiment. Initially, as indicated at block 210, a request to access a secured portion of a website is received from a user. In one embodiment, access information (e.g., login name, password, security message), which is included in the request for access, is submitted by the user at computing device 160 and/or mobile device 110. Incident to receiving the request, the user profile may be searched for security credentials that correspond to the requesting user. The security credentials may then be compared against the access information received in the request according a procedure for validating the set of security credentials.

Then a determination of the dial-in number to convey to the user is performed, as indicated at block 220. In one embodiment, the dial-in number is determined by identifying a subscriber that is requesting the communications network to authenticate a requesting user's mobile device, and then locating an associated dial-in number at the subscriber profile. This step of determination is discussed more fully below with reference to FIG. 3

As indicated at block 230, incident to a user requesting access to a secured portion of the subscriber's website, the communications network conveys one or more dial-in numbers. that are presented on user interface 165. In one embodiment, conveying includes transmitting the dial-in number to a subscriber server. The subscriber server then forwards the dial-in number to a computing device or mobile device for presentation to the user. In another embodiment, conveying includes transmitting from the communications network to the mobile device of the requesting user. In yet another embodiment, more fully discussed below with reference to FIG. 6, no dial-in number is conveyed, but instead, a communication or message is sent to the user's mobile device upon the communications network identifying the requesting user.

The user, or calling party in possession of the user's mobile device, may attempt to make a call to the communications network, as indicated at block 240. In one embodiment, attempting to call includes entering the dial-in number into the user device. In another embodiment, attempting to call includes replying to a text-message or voice message conveyed from the communications network to the mobile device. In one instance of these embodiments, the attempt to call will fail if a prescribed amount of time has elapsed between conveying the dial-in number and receiving a communication from the mobile device utilizing the conveyed dial-in number.

As indicated at block 250, the communications network authorizes the mobile device by using a network-authentication procedure. An illustrative network-authentication procedure extracts the device identifier embedded within, or appended to, a communication from the user's mobile device. In one embodiment, the device identifier is received at the communications-network server, and/or at a network gateway. Next, a determination of the authenticity of a mobile device based, at least in part, upon the device identifier (e.g., ESN, MSID) is performed. In one embodiment, the determination of authenticity includes authenticating the device identifier against trustworthy information associated with a user registered on the communications network. For instance, profiles database is referenced to compare the received device identifier against stored subscriber and/or user information.

If the device identifiers and stored information sufficiently correspond, the network-authentication procedures are considered satisfied and the call is completed, as indicated at block 260. By completing the call, the communications network is affirming that the mobile device is truly the same device as held out by the user. As such, the technologies associated with authenticating the mobile device are leveraged to satisfy security requirements of the subscriber.

If the call is completed, as discussed above, a communication is relayed to the subscriber associated with the requesting user that the call from the requesting user's mobile device is successful. This is indicated at block 270. In one embodiment, an indication of validity is transmitted to subscriber server from the communications network. If, however, there are one or more inconsistencies upon authentication, the call is not completed and an indication of invalidity, or no indication of validity, is relayed to subscriber server.

Upon completing the call, access to the secured digital information may be granted, as indicated at block 280. If the step of determining whether the network-authentication procedures are satisfied utilizing components of the communications network is the only security credential that requires satisfaction, access is granted. But, if the subscriber server has established other security credentials that are to be validated (i.e., additional layers of security), access is granted upon satisfying each of the security credentials. Establishing the set of security credentials is discussed more fully in FIG. 5, while satisfying the set of security credentials is discussed more fully in FIG. 6.

Figure 3:
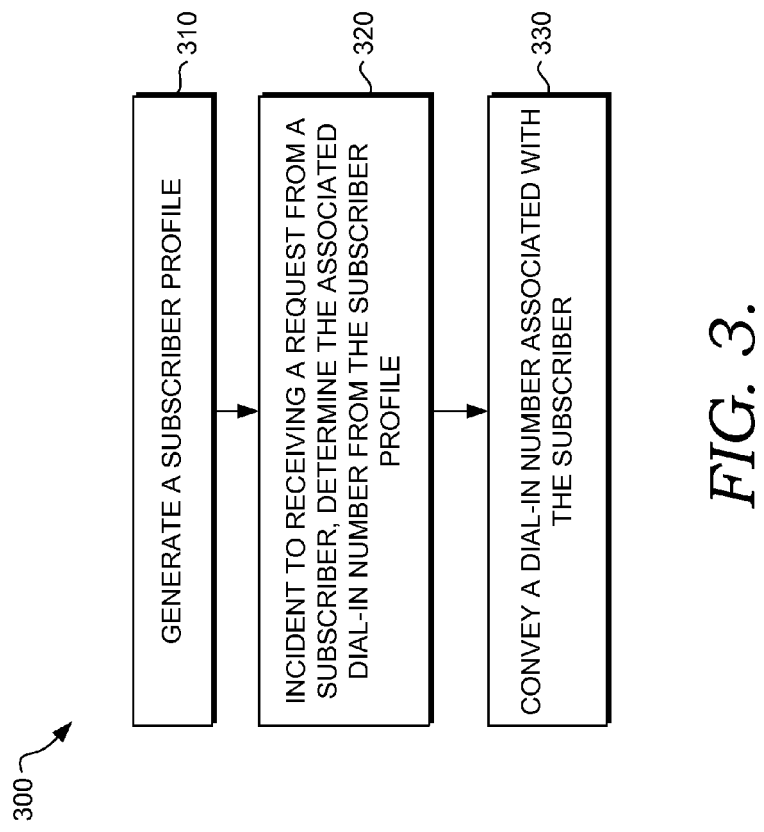
FIG. 3 is a flow diagram showing a method for determining a dial-in number to convey in response to a request for access, in accordance with an embodiment.

Turning now to FIG. 3, a flow diagram is illustrated that shows a method 300 for determining a dial-in number to convey in response to a request for access, in accordance with an embodiment. As indicated at block 310, a subscriber profile is created, which may be stored at the profiles database. In one embodiment, the user profile stores a dial-in number in association with a subscriber. Incident to receiving a request for access from a user, the subscriber initiates a request for authentication of the requesting user's mobile device. As indicated at block 320, incident to receiving the request from the subscriber, the communications network determines the dial-in number(s) associated with the subscriber at the subscriber profile. Then, the associated dial-in number is conveyed to the subscriber, requesting user's mobile device, or both.

Figure 4:
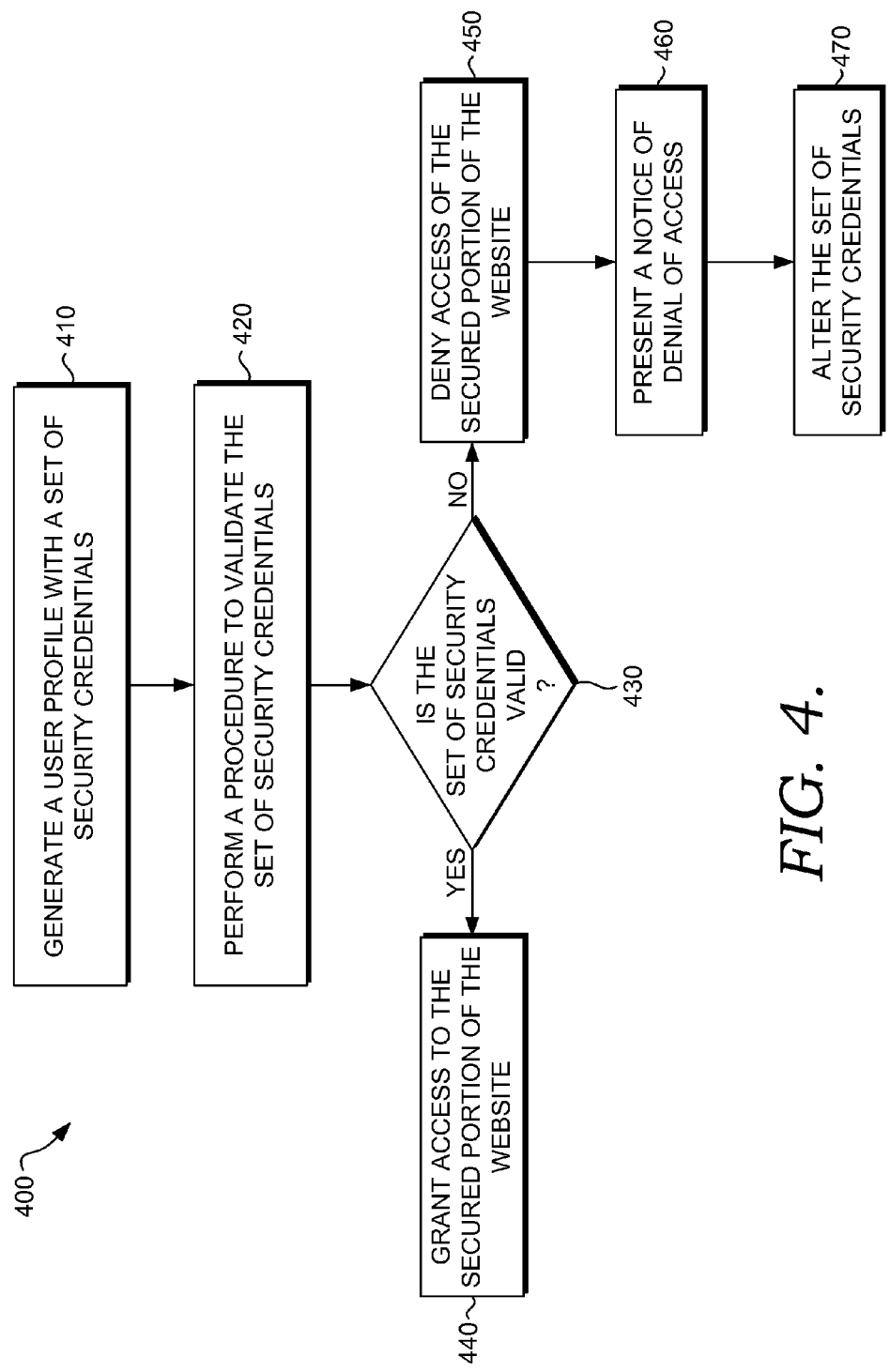
FIG. 4 is a flow diagram showing a method for verifying the identity of the user based on the set of security credentials, in accordance with an embodiment.

With reference to FIG. 4, a flow diagram is illustrated that shows a method 400 for verifying the identity of the user based on the set of security credentials, in accordance with an embodiment. As indicated at block, 410, a user profile with a set of security credentials is generated. Then a procedure is performed, incident to receiving a request to access, that validates the set of security credentials, as indicated at block 420. The procedure includes one or a combination of the following: comparing one or more of the set of security credentials against the received access information, satisfying a set of network-authentication procedures, or utilizing other mechanisms to verify the identity of the requesting user.

With more particularity, comparing includes receiving from a user access information and evaluating the access information against the security credentials. As indicated at block 430, if the set of security credentials is determined validated upon performing a validation procedure, then access is granted to the secured portion of the website (block 440). If, however, the set of security credentials is determined not validated by the user's request for access, access is denied to the secured portion of the website (block 450). As indicated at block 460, in the instance of denied access, a notice of denial of access is presented to the user at the user interface.

Further, as indicated at block 470, the denied request triggers security functions that alter the set of security credentials to prevent further requests for access from the unauthorized user.

Figure 5:
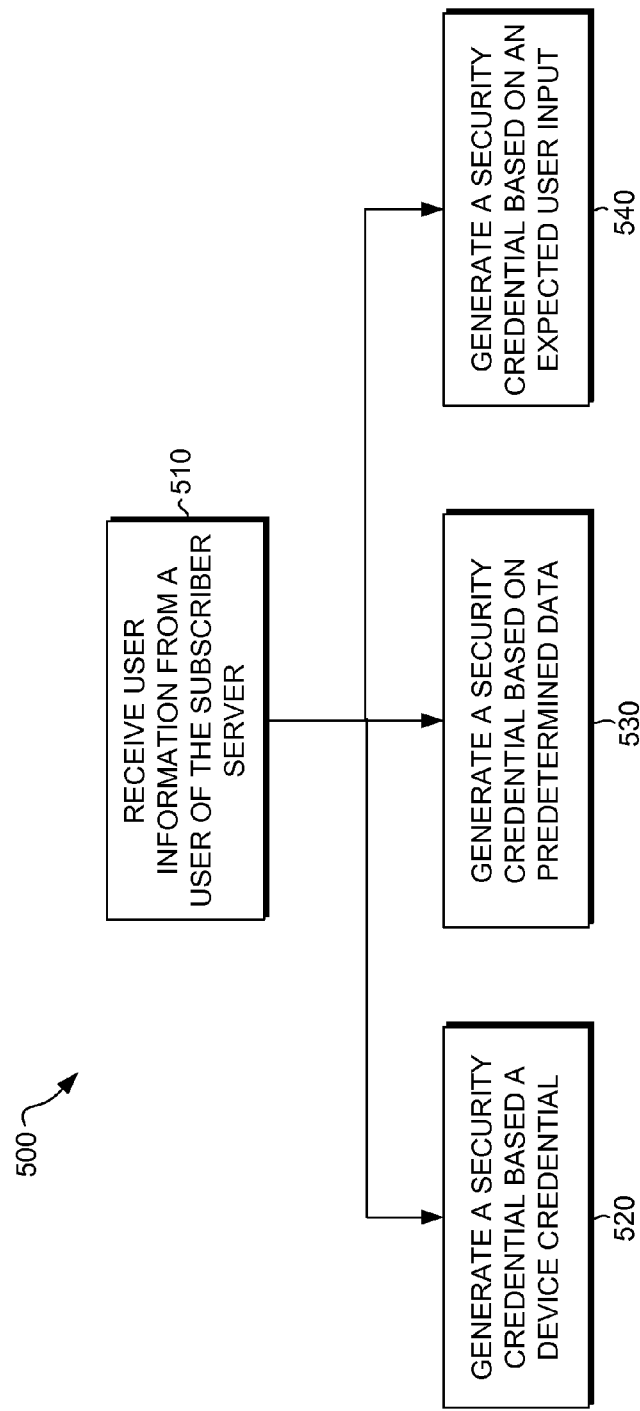
FIG. 5 is a flow diagram showing a method for establishing several of the set of security credentials, in accordance with an embodiment.

A flow diagram is illustrated in FIG. 5 that shows a method 500 for establishing several of the set of security credentials, in accordance with an embodiment. Initially, as indicated at block 510, user information is received from a user of a subscriber server. As indicated at blocks 520, 530, and 540, security credentials may be generated based on the user information. In particular, as indicated at block 520, a device identifier provisioned into the user's mobile device is registered with the communications network. As indicated at block 530, predetermined data is based on user information received from a user or data generated by the subscriber server. As indicated at block 540, an expected user input is utilized. In embodiments, the expected user input is a message entered at a user interface on the computing device or a response at a mobile device. This may be utilized to generate a set of security credentials along with other information. Some of the set of security credentials may be aggregated to establish a user profile that is accessible to the subscriber server, communications network, or both.

Figure 6:
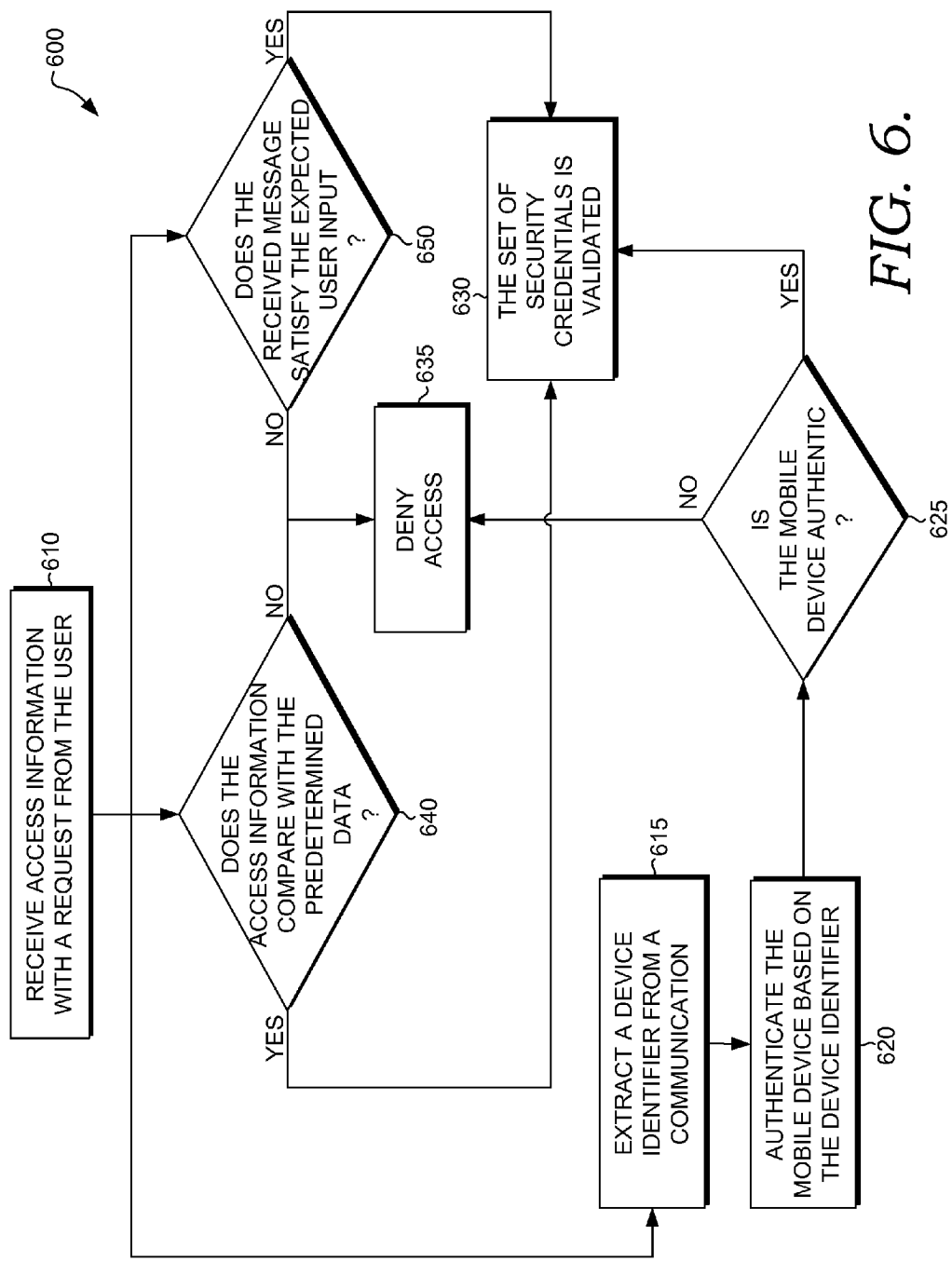
FIG. 6 is a flow diagram showing a method for validating security credentials against a device identifier received from a mobile device to access information received in a user request for access, in accordance with an embodiment.

Turning now to FIG. 6, a flow diagram is illustrated that shows a method 600 for validating security credentials against a device identifier received from a mobile device or against access information received in a user request for access, in accordance with an embodiment. As indicated at block 610, upon receiving information with a request for access, a process for determining whether the set of security credentials is satisfied is employed. In one embodiment, access is controlled and typically granted incident to receiving an indication that the user possesses a mobile device registered with the subscriber.

Determining whether the user possesses the mobile device is based upon satisfying a set of network-authentication procedures. These procedures include, as indicated at block 615, extracting a device identifier embedded within a communication transmitted from the mobile device. As discussed above, the communication may be initiated in a plurality of ways. In one embodiment, the communication is transmitted incident to the user entering and calling a dial-in number presented at a user interface, discussed below with reference to FIG. 7. In another embodiment, the communication is initiated upon the user selecting a link on a user interface that triggers the communications network to send a transmission (e.g., call, text, IM) to the mobile device. Upon the user of the mobile device consuming this transmission, a communication is provided to the communications network indicating that the user is in possession of the mobile device. This is discussed below with reference to FIG. 8.

Returning to FIG. 6, next, the mobile device may be identified as being registered to a particular user based on the communication, as indicated at block 620. If these, and other, network-authentication procedures are satisfied (block 625), the set of security credentials may be considered validated (block 630). Otherwise, the user is denied access to the digitally secured information, as indicated at block 635.

In some embodiments, additional security measures may be provided in conjunction with the network-authentication procedures to increase security and ensure that mere possession of a particular mobile device is not the single method for granting access. In this way, hacking into the secured site requires an unauthorized user to possess skills and tools to supersede more than one different security system, making a compromise of the security measures a highly unlikely event. In embodiments, the communications network and/or subscriber server may require access information uncommon to other individuals and the above-described mobile device authentication.

In one embodiment, as indicated at block 640, a determination of whether access information compares with a predetermined data security credential is performed. If, the access information corresponds with the predetermined data, then the set of security credentials is deemed validated (block 630). If inconsistent with the predetermined data, the invalid access information will cause the subscriber server to deny the user access (block 635).

In another embodiment, a transmission is sent from the communications network to the mobile device that includes a message. In one embodiment, the message is embedded within an instant message (IM), a text, voice mail, digital photo, email, and the like. Further, the message may be conveyed in an easily recognized format, or may be obscured (e.g., requesting the user to identify a previously submitted digital photo, requesting the user to answer a previously submitted query). The next step of this layered authentication process may be providing the message as an input in response to a prompt at the user interface (e.g., at an input-entry area), as indicated at block 650.

If the message corresponds with the expected user input security credentials, then the set of security credentials may be validating, as indicated at block 630. If inconsistent with the expected user input, the invalid message will cause the subscriber server to deny the user access, as indicated at block 635. In a variation of this embodiment, instead of providing the message to the input-entry area of the user interface, the message may be returned to the communications network from the same mobile device, or a second mobile device. If this message and/or communication is authenticated, then a second indication of validity may be sent to the subscriber server as part of the validation process.

Other embodiments of layered security include the following exemplary controls. In one instance, incident to transmitting a communication from a mobile device to the communications network, the communications network provides a query to which the user responds (e.g., stating a password, entering a PIN on the keypad of the mobile device, providing information about the current status of an account with the subscriber server, submitting a token from the mobile device, etc.). In another instance, the communications network utilizes voice recognition to verify the user when stating a response to complete authentication. In yet another instance, if the mobile device is equipped with certain capabilities, biometric data (e.g., retina-scan, DNA, finger-print) is provided within the communication transmitted from the mobile device. In still another instance, the communication may be automatically transmitted from the mobile device if the computing device includes short-range wireless capability to detect whether the phone is in a certain proximity of the computing device. Although a plurality of different embodiments of layered security has been shown, it should be understood and appreciated that other methods could be used, and that other embodiments not shown and described may achieve a similar purpose.

Figure 7:
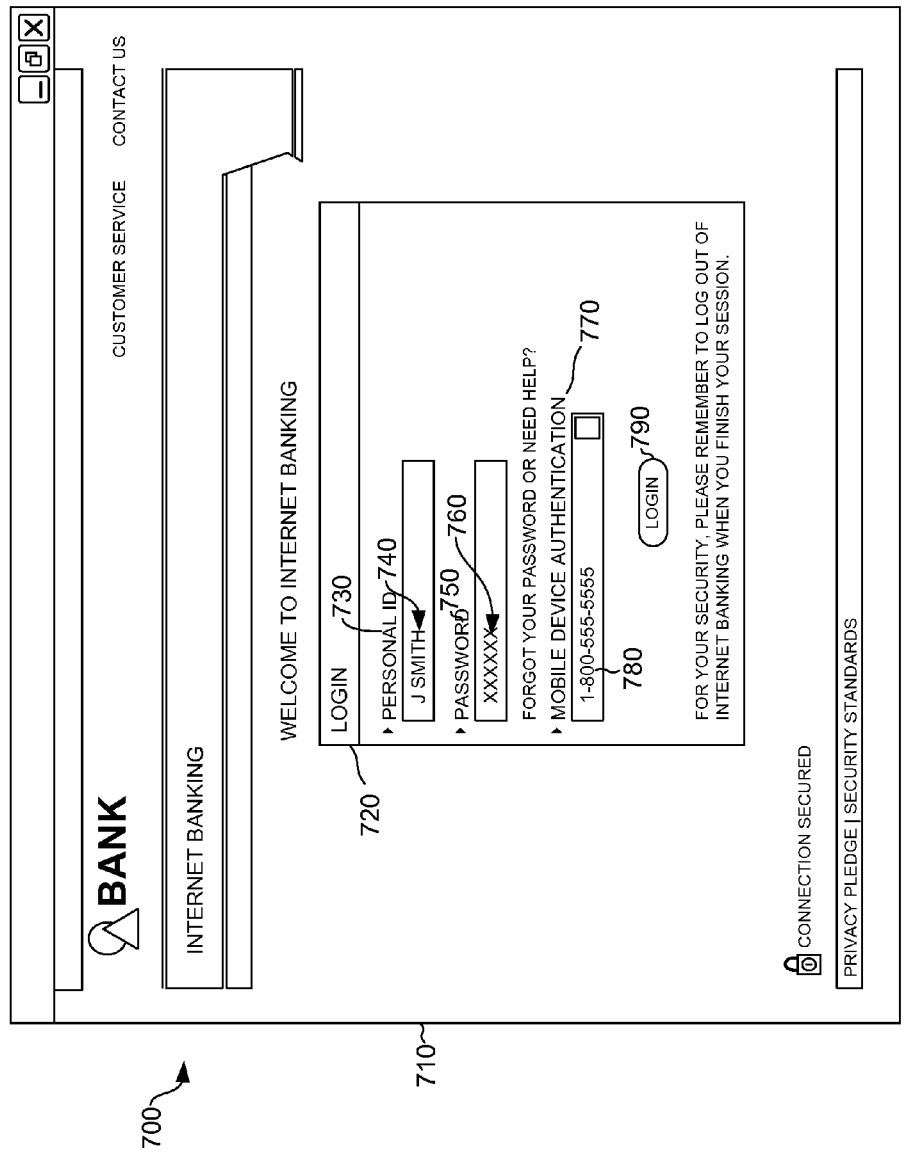
FIG. 7 is an exemplary screen display of an exemplary user interface wherein a user is prompted to input access information for verifying the identity of the user.

With reference to FIG. 7, an exemplary screen display 710 of an exemplary user interface 700 is illustrated, where a user is prompted to input access information for verifying the identity of the user. A login portion 720 is depicted having prompts for the user to input access information. In particular, included is a prompt 730 for the user to input a personal ID in input-entry area 740, and a prompt 750 for the user to input a password in input-entry area 760. Also shown is a prompt 770 to authenticate the mobile device by providing a dial-in number 780. Selectable login area 790 is provided to submit the access information as a request for access.

Figure 8:
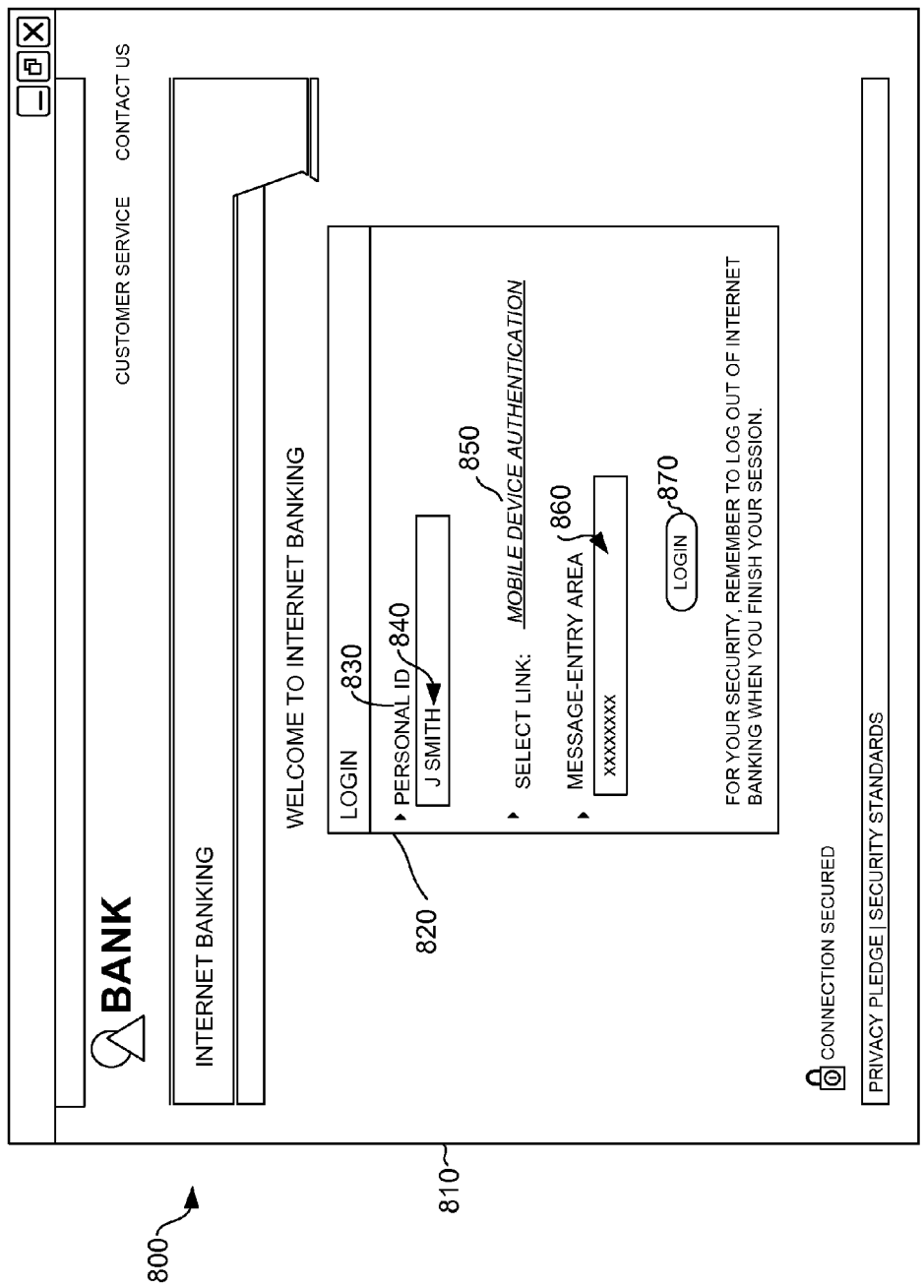
FIG. 8 is an exemplary screen display of an exemplary user interface similar to the screen display of FIG. 7, but with an illustrative link for triggering a communications-network server to send a transmission to the user's mobile device.

Turning now to FIG. 8, an exemplary screen display 810 of an exemplary user interface 800 is illustrated, similar to the screen display 710 of FIG. 7, but with a link 850 for triggering a communications-network server to send a transmission to the user's mobile device. A login portion 820 is depicted having a prompt 830 for the user to input a personal ID in an input-entry area 840. Link 850 is selectable by the user, and incident to selection, may indicate to the communications network that a transmission should be sent to the mobile device registered to the user. The transmission sent to the mobile device may include a message that may be input into message-entry area 860 as a layered measure of security. Selectable login area 870 is provided to submit the access information and message as a request for access. Accordingly, in view of these two exemplary user interfaces 700 and 800, the set of security credentials functions as a robust security measure that allows those users authorized to access the secured portion of the website entry therein, while detected and excluding the unauthorized users.

Figure 9:
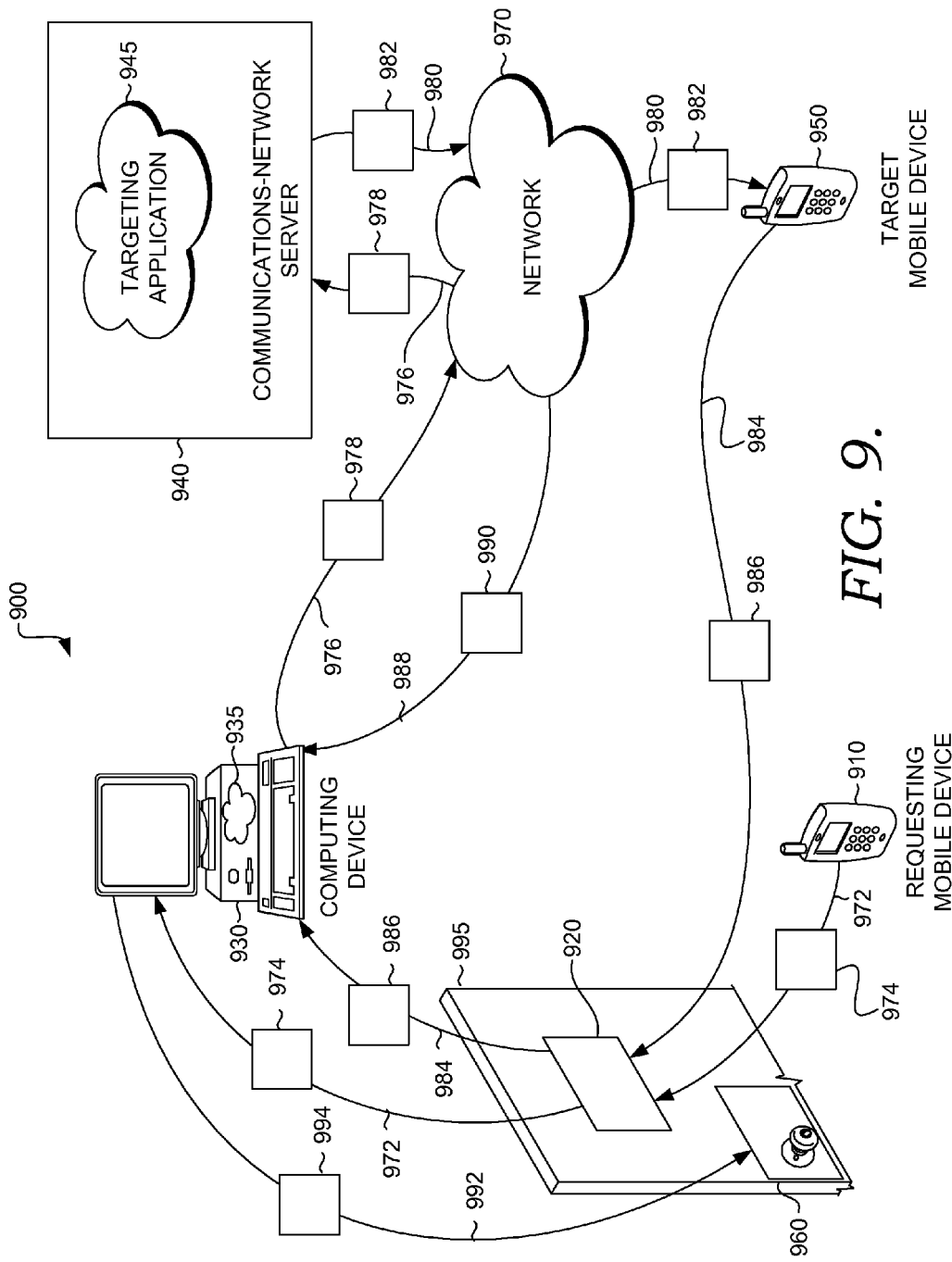
FIG. 9 is a block diagram of an exemplary system architecture suitable for use in implementing embodiments of the present invention.

Referring to FIG. 9, a block diagram of an exemplary operating environment is shown and designated generally as computing system 900, configured to determine whether a mobile device is authorized to operate an electronic locking mechanism.

Illustrative computing system 900 includes, in one embodiment, a requesting mobile device 910, a sensing device 920, a computing device 930 having an authentication application 935 residing thereon, a communications-network server 940 having a targeting application 945 residing thereon, a target mobile device 950, and an electronic locking mechanism 960, all in communication with one another via a network 970 (which may actually be multiple networks). Although the various components of FIG. 9 are shown with lines for the sake of clarity, in reality, delineating various components is not so clear and, metaphorically, the lines would more accurately be grey or fuzzy.

Further, although some components of FIG. 9 are depicted as single blocks, the depictions are exemplary in nature and in number and are not to be construed as limiting (e.g., although only one requesting mobile device 910 and one target mobile device 950 are shown, many more may be operably coupled to network 970). Network 970 couples components 910, 920, 930, 940, 950, and 960 (wired, wirelessly, or a combination thereof).

Mobile device 910 is configured to communicate a request 972 to network 970. In one embodiment, request 972 includes an identifier 974 that identifies target mobile device 950. In addition, requesting mobile device 910 and target mobile device 950 may be any type of device having communications capability. Mobile devices 910 and 950 may be, or variously referred to as, a handheld device, mobile handset, consumer electronics device, cell phone, personal digital assistant (PDA) unit, and the like. Further, each mobile device 910 and 950 is provisioned with a device identifier that is communicated within request 972 in the form of identifier 974, as discussed above. In one embodiment, identifier 974 is embedded in, or appended to, each communication transmitted from requesting mobile device 910. In another embodiment, request 972 is automatically transmitted from requesting mobile device 910 upon entering within a predefined proximity to sensing device 920, as more fully discussed below with reference to sensing device 920.

Each of sensing device 920, computing device 930, communications-network server 940, and electronic locking mechanism 960 shown in FIG. 9 may take the form of various types of computing devices. By way of example only, components 920, 930, 940, and 960 may be a personal computing device, handheld device, consumer electronic device, and the like. Additionally, computing device 930 includes authentication application 935 residing thereon, and communications-network server 940 includes targeting application 945 residing thereon. Applications 935 and 945, as well as mobile devices 910 and 950, are configured to execute computer-usable instructions embodied on one or more computer-readable medium.

Returning to FIG. 9, sensing device 920 receives request 972 and passes identifier 974 on to computing device 930. In one embodiment, sensing device is a data-enabled, near-range, wireless sensor (e.g., Bluetooth enabled, near-field communication (NFC) capable, universal serial bus (USB) wireless, and the like) that automatically receives request 972 upon requesting mobile device 910 entering within a predefined proximity of sensing device 920. In this embodiment, requesting mobile device 910 is equipped with a communication transmitter that broadcasts a wireless signal at a particular range. In embodiments, sensing device 920 is located near, or assembled to, a physical structure 995. However, it should be appreciated and understood that sensing device 920 may be located separately or within any component of network 970 (i.e., embedded within computing device 930).

Computing device 930 can perform various functions. In some embodiments, these functions are executed by authorization application 935. The functions include performing an initial validation sequence, conducting a validation procedure, and, if the target mobile device is deemed valid, granting permission to operate electronic locking mechanism 960. These procedures are discussed in detail below with reference to FIG. 10, and therefore are described with brevity immediately below. The initial validation sequence receives request 972 and determines a device identifier 978 based thereon. In embodiments, device identifier 978 is communicated to communications-network server 940 concomitantly with a request 976 that a message be communicated to target mobile device 950. The validation procedure compares validation data 990 received in a communication 988 from communications network server 940, or determined at computing device 930, against authentication information 986 received in a message 984 from target mobile device 950. Upon performing the comparison, authentication information 986 is characterized as valid or invalid. In one embodiment, a determination of valid indicates target mobile device 950 is authorized to operate locking mechanism 960. In this embodiment, a conveyance 992, which has an indication of permission 994, is provided to electronic locking mechanism 960. Alternatively, a determination of invalid indicates target mobile device 950 is not authorized. In this instance, one or more security measures may be taken to prevent present and/or future fraudulent activity.

Communications-network server 940 is capable of identifying target mobile device 950 and communicating a message thereto. In one embodiment, target application 945 resides on communications-network server 940 and serves to perform a plurality of functions, including receiving request 976, extracting device identity 978 therefrom, identifying target mobile device 950 according to device identity 978, and communicating a message 980 to target mobile device 950. Message 980 includes, by way of example, validation data 982 that is comparable to validation data 990 received or generated at computing device 930.

In an exemplary embodiment, message 980 is transmitted via a secure pathway within the infrastructure of the communications network. That is, the preexisting security measures employed in a communications network, typically wireless, are leveraged to guarantee that message 980 is received only by target mobile device 950, thereby providing a first level of security. These security measures being employed may be standard within the communications network, or of an enhanced nature that provides heightened, robust protection during transmission over other intra-network communications. As such, those mobile device(s) having a specific address being identified and targeted by communications-network server 940 will receive message 980 exclusively. In one instance, the specific address comprises an authentication key that is unique to each mobile device thereby assuring that a transaction from communications-network server 940 is directed solely toward target mobile device 950. In another instance, the communications-network server 940 utilizes the security technology (e.g., code division multiple access (CDMA) cellular technology that employs spread-spectrum technology and a special coding scheme, where each transmitter is assigned a code) that is presently implemented to protect the traffic among network resources.

In another embodiment, the message 980 may be communicated as a secured message (e.g., difficult to reproduce, hack, read by non-targeted devices, etc.). In one instance message 980 is secured with an encryption algorithm that is resistive to spoofing attacks. Accordingly, the communications-network server 940 leverages the communications network security technology to ensure only target mobile device 950 will receive message 980.

Although the plurality of functions performed by computing device 930 and communications-network server 940 are illustrated as discrete steps, this methodical discussion is not intended to limit the scope of use, or the functionality, of the invention. Neither should the invention be interpreted as having a dependency or requirement relating to one, or a combination, of steps discussed in the exemplary embodiments above. Further, these steps and/or functions may be also be performed at any other component operably coupled to network 970.

Target mobile device 950 is a device that is wirelessly coupled to communications network server 940 via network 970 and is configured to perform a variety of functions in one embodiment. One of these functions includes receiving message 980 from communications-network server 940. Another of these functions includes extracting validation data 982 upon reading message 980. Yet another of these functions includes communicating message 984 to computing device 930 via sensing device 920 that includes authentication information 986 based on, in part, validation data 982. Authentication information may be additionally based on other information (e.g., user password/pass-code, biometric data, device location, etc.) and encoded or hashed with validation data 982. One or more of these functions may be carried out by targeting application 945 on communications-network server 940.

Electronic locking mechanism 960 is operable to control, or allow remote control of, a mechanical device for securing or releasing physical structure 995. As discussed above, electronic locking mechanism 960 is coupled to computing device 930, and receives direction (e.g., conveyance 992) therefrom. In embodiments, upon receiving conveyance 992, electronic locking mechanism 960 extracts indication of permission 994 in order to determine whether to allow remote control of its functions. In one embodiment, conveyance 992 is provided when target mobile device 950 is authenticated. Accordingly, permission to operate electronic locking mechanism 960 is provided to target mobile device 950 automatically incident to indication of validity 994 being transmitted from computing device 930.

Figure 10:
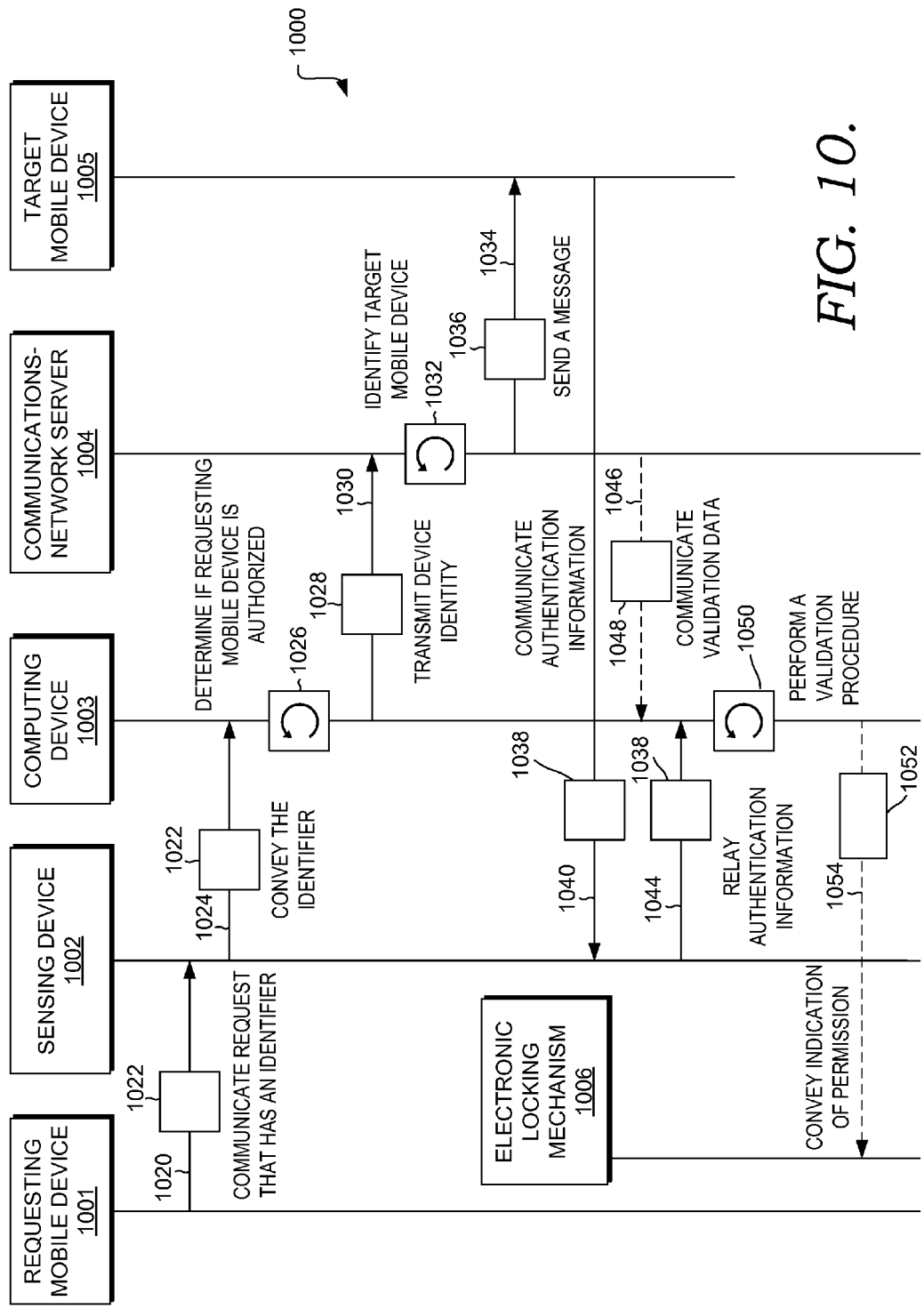
FIG. 10 is a diagrammatic chart showing a method for operating an electronic locking mechanism using a mobile device, in accordance with an embodiment of the present invention.

Turning to FIG. 10, an illustrative process flow 1000 associated with the invention is now described. Initially, at step 1020, a request that has an identifier 1022 is communicated from a requesting mobile device 1001 to a sensing device 1002. In embodiments, the identifier may comprise one or more of the following: a unique identifier (e.g., ESN), a general identifier (e.g., MIN), or another signal that indicates requesting mobile device 1001. In another embodiment, requesting mobile device 1001 automatically initiates a standby mode that is typically internal to requesting mobile device 1001. Typically, standby mode has a predefined duration. If a message from a communications-network server 1004 is not received within the predefined duration, a fraudulent condition is found. Accordingly, by way of example, requesting mobile device 1001 appends an indication of fraud to one or more communications (i.e., message at step 1040), in order to alert other components of the lapse of the predefined duration of standby mode.

At step 1024, sensing device 1002 conveys identifier 1022 to a computing device 1003. Incident to receiving identifier 1022, computing device 1003 launches an initial validation procedure 1026 to determine whether the requesting mobile device is authorized. The initial validation procedure comprises a plurality of functions. These functions include, but are not limited to, the following: identifying a device identity or targeted mobile device 1005, requesting a message be communicated to target mobile device 1005, and, optionally, determine validation data. Validation data may alternatively, or additionally, be provided at step 1024, more fully discussed below. Identifying the device identity or target mobile device 1005 incorporates identifier 1022 as one of the factors for identification. In one embodiment, identifier 1022 is input into a lookup table that enables a search to identify the corresponding device identity. That is, the look up table maps the device identity to one or more identifiers 1022. In another embodiment, identifier 1022 is compared against a list of acceptable predefined target mobile devices 1005; thus, inherently performing an initial authentication of requesting mobile device 1001. Requesting a message be communicated to target mobile device 1005 includes communicating a device identity 1028 to a communications-network server 1004, as indicated at step 1030. The communication may be one or more of a variety of forms that include, for example, short-burst transmission, short message service (SMS) or multimedia message service (MMS) message, hexadecimal string of information (e.g., phone number of requesting mobile device 1001), and the like.

At step 1032, communications-network server 1004 identifies target mobile device 1005 based, in part, on device identity 1028. In one embodiment, a look up table that stores device identities 1028 in association with representations of target mobile devices 1005 is utilized for identification, where identification is based, in part, on inputting device identity 1028 into the look up table.

Incident to determining the identity of target mobile device 1005, a message 1034 that has validation information 1036 is communicated to identified target mobile device 1005. Although target mobile device 1005 is illustrated and referred to in the singular, it is contemplated by the present invention that multiple target mobile devices 1005 may be identified and sent a message. Further, it should be understood and appreciated that requesting mobile device 1001 may be identified as a target mobile device 1005, thus, satisfying the standby mode security layer if validation data 1036 is provided within the predefined duration. In one embodiment, the message is sent over a secured circuit or pathway of the communications network infrastructure. In another embodiment, the message is a secured message that may not be replicated or intercepted. Advantageously, in these embodiments, the ability of communications-network server 1004 to target a mobile device and provide a message in a protected manner manifests a situation where target mobile device 1005 is appropriately selected to achieve authorization to operate an electronic locking mechanism 1006.

Additional layers of security may include providing supplementary data in the message carrying validation data 1036. By way of example, the supplementary data includes communications network information (i.e., phone number from which the message to target mobile device 1005 was placed), a unique identification code, a prompt for the user in possession of target mobile device 1005 to provide data (e.g., password, biometric data, device-location information, and the like), or a prompt to place a return call to communications-network server 1004. In the latter instance, where the user is prompted to place a return call to the network-authentication server 1004, target mobile device 1005 is validated by leveraging the technologies associated with authenticating the mobile device attempting to access the communications network, discussed above with reference to FIGS. 1-8. Alternatively, in an embodiment where no user prompt is required, target mobile device 1005, in a manner transparent to the user, recognizes the message as having validation data (e.g., by a script extension on the message), automatically consumes validation data 1036, and converts the validation data 1036 to authentication information 1038 prior to passing the message to computing device 1003.

Target mobile device 1005 communicates validation data 1036, supplemental data, or both, as authentication information 1038 to sensing device 1002, at step 1040, in a similar fashion as requesting mobile device 1001, as discussed above. In one embodiment, authentication information 1038 may comprise validation data 1036 hashed (e.g., encoded, encrypted, or the like) with supplemental data so as to provide an additional layer of security. Sensing device 1002 then automatically relays authentication information 1038 to computing device 1003 at step 1044. In one embodiment, concomitantly with, or subsequent to, authentication information 1038 being provided to computing device 1003, validation data 1048 is communicated to computing device 1003 from the communications network. Although illustrated in FIG. 10, step 1046 is optional. In another embodiment, authentication data 1038 is generated at computing device during the initial validation sequence at step 1026, and provided communications-network server 1004 at step 1030.

A validation procedure 1050 is performed incident to receiving authentication information 1038. Validation procedure 1050 includes, but is not limited to, the following functions: receiving a message from target mobile device 1005 and extracting authentication information 1038 therefrom, comparing validation data 1048 against authentication information 1038, and conveying an indication of permission 1052 if authentication information 1038 is characterized as valid, i.e., the validation procedure is satisfied. In one embodiment, where device-location information is hashed with validation data 1036 and communicated as authentication information 1048, computing device 1003 compares the device-location information (e.g., GPS location), against coordinates of target mobile device 1005, which are typically received from communications-network server 1004, in addition to performing validation procedures 1050 discussed above. This additional layer of security of utilizing the device-location information is discussed more fully below with reference to FIG. 11. If the validation procedure is not satisfied, indication of permission 1052 may be withheld from being conveyed to electronic locking mechanism 1006, as such, step 1054 is dependent on whether the validation procedure 1050 is satisfied. Further, if the validation procedures are not satisfied, computing device 1003 may commence a fraud-protection sequence (not shown) to inhibit unauthorized control of electronic locking mechanism 1006. The fraud-protection sequence is discussed more fully below with reference to FIG. 13.

Figure 11:
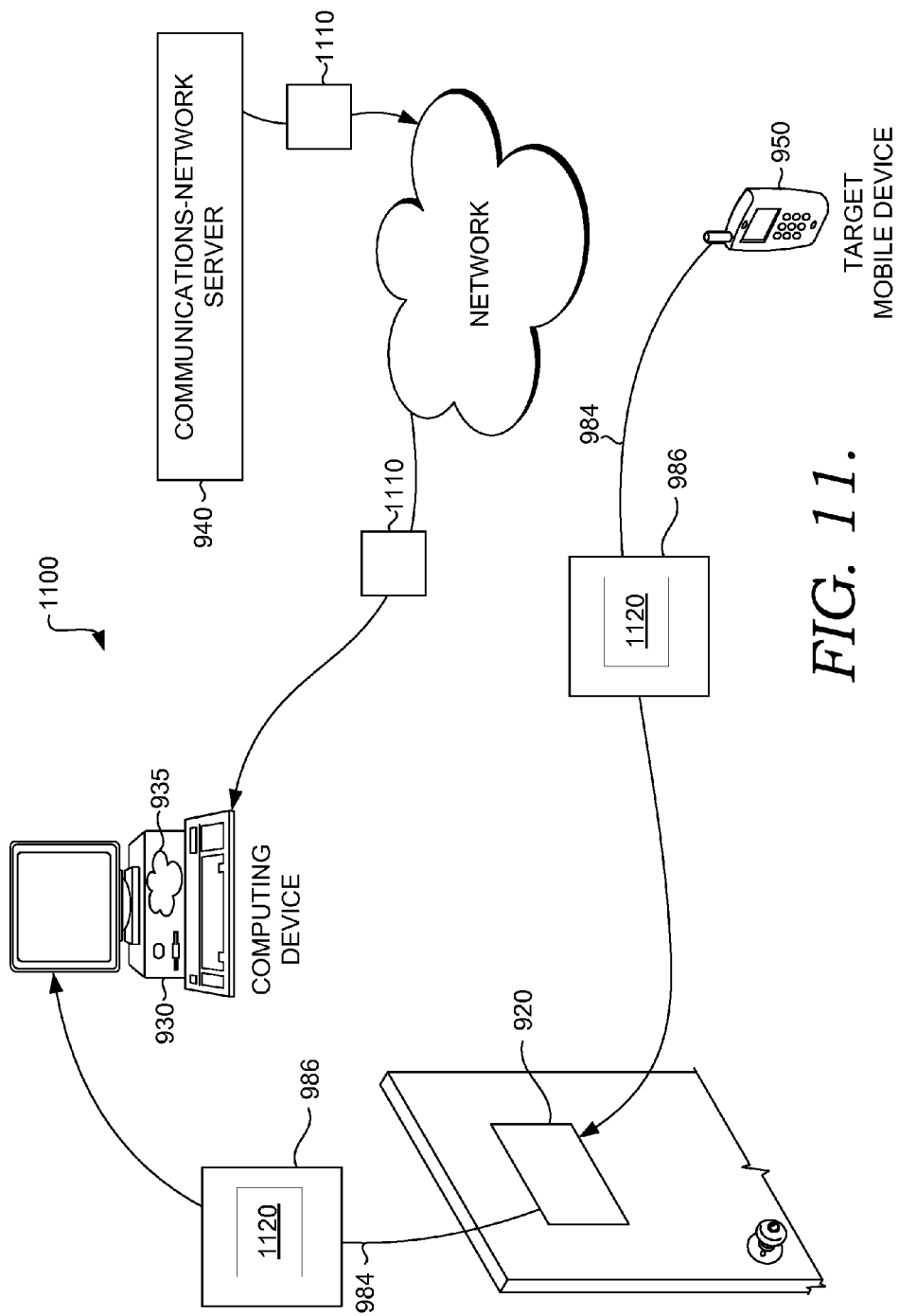
FIG. 11 is a block diagram of an exemplary system architecture suitable for implementing embodiments of the present invention whereby the GPS location of the target mobile device is provided as an additional layer of security.

Referring now to FIG. 11, a block diagram is illustrated of an exemplary system architecture 1100 suitable for implementing embodiments of the present invention whereby the GPS location of target mobile device 950 is provided as an additional layer of security. In particular, target mobile device 950 incorporates device-location information 1120 into authentication information 986 that is communicated in message 984 to computing device 930 via sensing device 920. Computing device 930 also receives coordinates 1110 (typically GPS) of target mobile device 950 concomitantly with, or independently from, the validation data. Authentication application 935 residing on computing device 930 compares the coordinates 1110 to device-location information 1120 to determine if a match exists. If so, this additional layer of security is satisfied. If not, permission to operate the electronic locking mechanism is denied.

Figure 12:
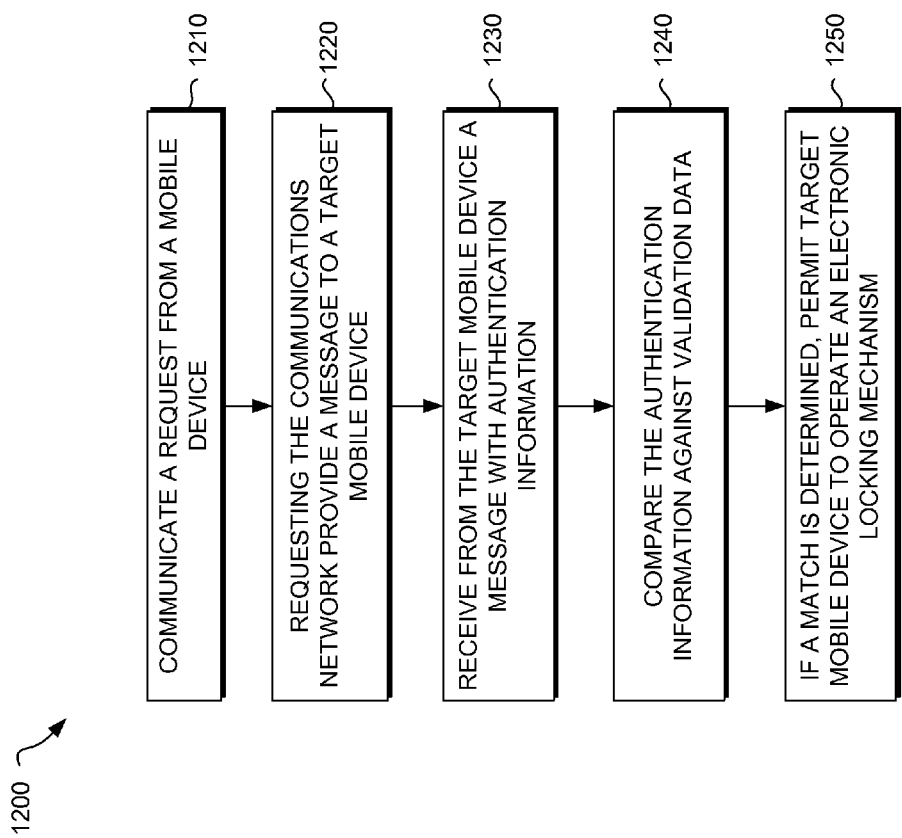
FIG. 12 is a flow diagram showing an overall method for verifying the identity of a user by authenticating a mobile device associated with that user, in accordance with an embodiment.

FIG. 12 is a flow diagram that shows an illustration of an overall method 1200 for verifying the identity of a user by authenticating a mobile device associated with that user, in accordance with an embodiment. Initially, as indicated at block 1210, a request to operate an electronic locking device is communicated from a mobile device. The computing device then requests that the communications network provide a message to a target mobile device, typically as part of the initial validation sequence, as indicated at block 1220. As indicated at block 1230, a message is received from the target mobile device that includes authentication information. The authentication information is compared against validation data, either generated by, or received from, the computing device, as indicated at block 1240. As part of the validation procedure, discussed more fully below with reference to FIG. 13, if a match is determined, the target mobile device is permitted to operate an electronic locking mechanism, as indicated at block 1250.

Figure 13:
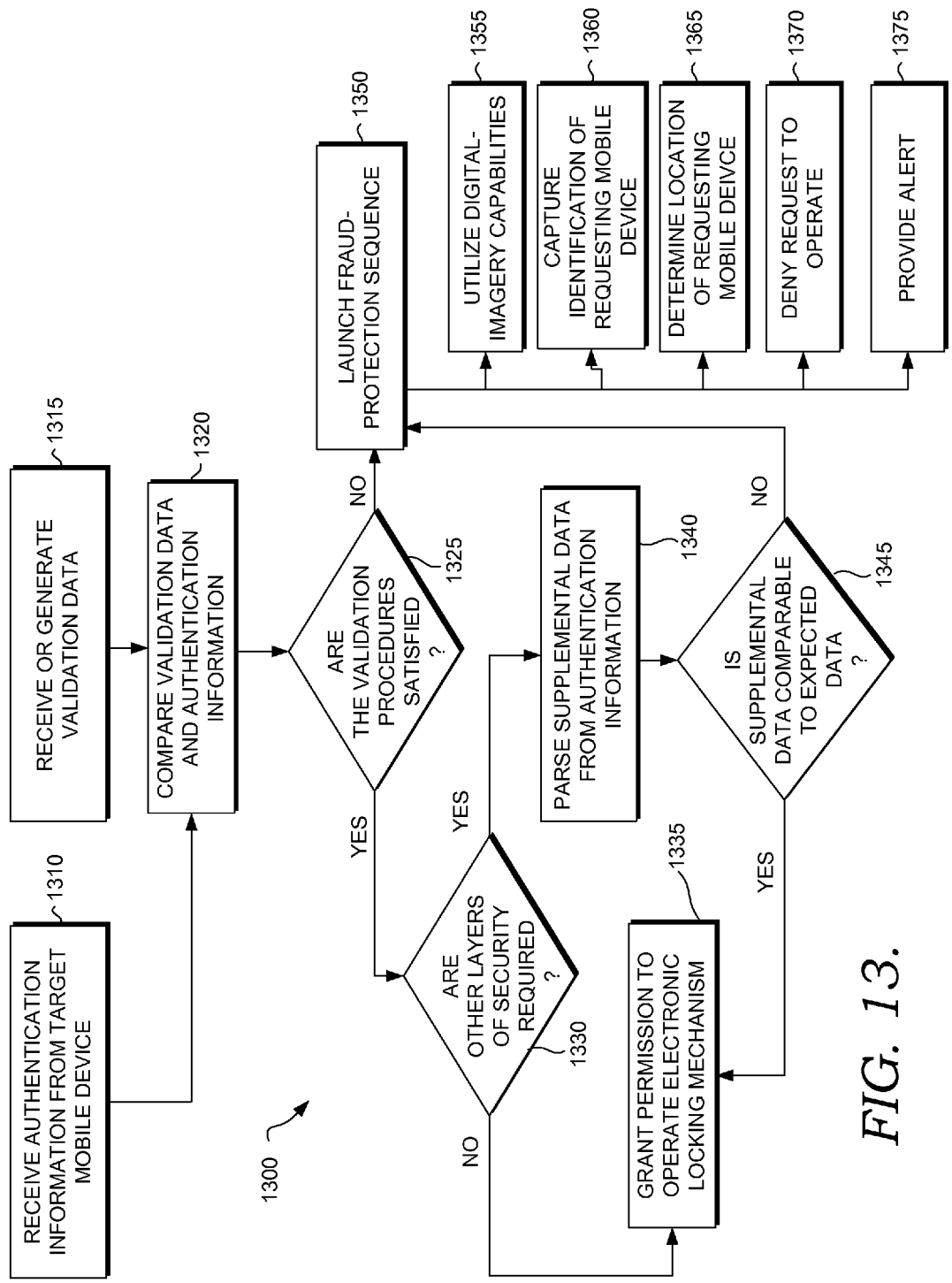
FIG. 13 is a flow diagram showing a method for validating the authentication information provided by a target mobile device.

FIG. 13 is a flow diagram that shows an illustration of a method 1300 for validating the authentication information provided by a target mobile device. Initially, authentication information is received from the target mobile device, as indicated at block 1310, and validation data is generated or received, as indicated at block 1315. The validation data and authentication information are compared to determine if there is a match, as indicated at block 1320. As indicated at block 1325, if a match exists and the balance of the validation procedures are satisfied, then a determination of whether there are other layers of security that should be satisfied is performed, as indicated at block 1330. If no other supplemental data (e.g., pass code, GPS location, biometric data, etc.) is needed to satisfy additional layers of security, then permission to operate the electronic locking mechanism is granted, as indicated at block 1335. If additional layers of security should be satisfied, then supplemental data is parsed from authentication information as indicated at block 1340. As indicated at block 1345, if the parsed supplemental data is comparable to expected data, which is typically stored in a database on the computing device, then the additional security measures are met and permission to operate the electronic locking mechanism is granted.

Alternatively, if either the supplemental data fails to satisfy the expected data, or the validation procedures are not satisfied, the fraud-protection sequence is launched. This embodiment of performing one or more steps upon indication of a fraud event is discussed below and illustrated at block 1350. As indicated at block 1355, one fraud-protection measure within the sequence utilizes digital-imagery capabilities of the requesting and/or target mobile device to take a picture of the user in possession of the device. In one embodiment, the picture is automatically taken and sent digitally to a legal authority, the target mobile device, the computing device, a database on the communications network, or any combination thereof. As indicated at block 1360, another fraud-protection technique includes capturing identification information of the requesting mobile device. This identification information can be stored in association with an indication of fraud such that future attempts from the requesting mobile device to gain control of this, or another, electronic locking mechanism are recognized as fraudulent. As indicated at block 1365, yet another fraud-protection aspect relates to determining the location of the requesting mobile device, if not within the proximity of the sensing device, such that authorities can track the device that is attempting unauthorized operation. As indicated at block 1370, in response to an unsatisfactory attempt to operate the electronic locking mechanism, the computing device can simply deny the request from the requesting mobile device. In one embodiment, an indicator will make the user in possession of the requesting mobile device aware of a failed attempt and prompt the user to try again. In another embodiment, the target mobile device will be identified as being compromised and, accordingly, unable to successfully communicate authentication information without being reprovisioned on the communications network. As indicated at block 1375, an alert of fraud is provided to one or more entities such that reactive measures can be taken to prevent the occurring, or further, fraud.

It should be understood and appreciated that the various fraud-protection measures may be executed individually or in any combination thereof. Further, the exemplary flow diagram illustrated in FIG. 13 is only one example of the suitable fraud-protection measures that may be instilled, and is not intended to suggest any limitation as to scope of use or functionality of the invention, but rather is intended to encompass all available fraud-protection techniques known in the art. Neither should the invention be interpreted as having any dependency or requirement relating to any one or combination of fraud-protection measures illustrated herein.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of operating an electronic locking mechanism using a communications network, the method comprising:

receiving a request to operate an electronic locking mechanism from a sensing device, wherein the request is initially issued to the sensing device from a requesting mobile device automatically upon the requesting mobile device entering within a predefined proximity of the sensing device, the request comprising an identifier;

employing a targeting application on a communications-network server to determine whether the requesting mobile device is authorized to operate the electronic locking mechanism, wherein the determining comprises:
  (a) identifying a target mobile device that has been pre-determined to be associated with the identifier provided by the requesting mobile device;
  (b) determining validation data associated with the target mobile device;
  (c) transmitting a message from the communications-network server, wherein the message is addressed to be delivered to the target mobile device, wherein the message includes the validation data, and wherein the message is transmitted, in part, across a secure pathway within an infrastructure of the communications network;
  (d) receiving authentication information from the sensing device, wherein the authentication information is initially issued to the sensing device from the target mobile device, and wherein the authentication information is generated via a process carried out at the target mobile device that employs the validation data carried within the message; and
  (e) comparing the received authentication information against the validation data to determine whether the target mobile device is authorized to operate the electronic locking mechanism; and upon determining that the received authentication information corresponds with the validation data, permitting the requesting mobile device to operate the electronic locking mechanism.

2. The media of claim 1, wherein identifying a target mobile device comprises utilizing a look up table to determine a device identity of the target mobile device, wherein the lookup table maps the device identity to the identifier.

3. The media of claim 2, wherein identifying a target mobile device further comprises:
  converting the identifier to the device identity; and
  transmitting the device identity to the communications network, the communications network utilizing the device identity as an input to identify the target mobile device.

4. The media of claim 1, wherein receiving from the target mobile device authentication information that is based on the message comprises receiving positioning information that indicates a location of the target mobile device.

5. The media of claim 4, wherein receiving from the target mobile device authentication information comprises receiving the location information to be utilized to ensure the target mobile device is within the proximity of the electronic locking mechanism.

6. The media of claim 1, wherein the message communicated to the target mobile device comprises authentication information in an encrypted form.

7. The media of claim 1, wherein the determining whether the target mobile device is authorized to operate the electronic locking mechanism comprises determining whether the authentication information satisfies the validation information.

8. The media of claim 1, wherein determining whether the target mobile device is authorized to operate the electronic locking mechanism further comprises:
  determining from the authentication information that the target mobile device is not authorized to operate the locking mechanism; and
  incident to the determination that the locking mechanism is not authorized, performing one or more of the following functions: utilizing digital-imagery capability of the mobile phone to take a picture of a user in possession of the requesting mobile device; utilizing digital-imagery capability of the mobile phone to take a picture of a user in possession of the target mobile device; storing an identification of the requesting mobile device in association with a indication of fraud; determining the location of the requesting mobile device; alerting authorities; alerting the target mobile device; restraining the requesting mobile device from operating the electronic locking mechanism; or preventing any further requests that precludes the identifier from operating the electronic locking device.

9. One or more non-transitory computer-readable media having computer-useable instructions embodied thereon for performing a method of operating an electronic locking mechanism using a communications network, the method comprising:
  automatically initiating a request upon the mobile device entering within a predefined proximity to a sensing device, the sensing device configured to signal an authorization application that is operable coupled to the electronic locking mechanism;
  communicating the request to operate the electronic locking mechanism, the request including an identifier for identifying the mobile device that is providing the request;
  receiving a message from a communications-network server by way of a secure pathway within an infrastructure of the communications network, the message including validation data being communicated to the mobile device, wherein the validation data is retrieved based on the identifier included within the request;
  extracting the validation data upon the mobile device reading the message;
  based on the validation data carried within the message, communicating authentication information that is determined as either valid or invalid, wherein a determination of valid indicates that the mobile device is authorized to operate the electronic locking mechanism, and a determination of invalid indicates that the mobile device is not authorized to operate the locking mechanism; and
  when the authentication information is determined to be valid, allowing the mobile device to operate the electronic locking mechanism.

10. The media of claim 9, wherein receiving a request by way of a communications network comprises the communications network identifying the mobile device by utilizing a look up table, wherein identification via the lookup table is based on inputting an identifier communicated within the request.

11. The media of claim 9, wherein communicating authentication information comprises communicating an indicia of the global positioning system (GPS) coordinates of the mobile device.

12. The media of claim 9, further comprising:
  incident to communicating a request to operate the electronic locking mechanism, automatically initiating a standby mode within the mobile device, the standby mode having a predefined duration; and appending an indication of fraud to the authentication information communicated from the mobile device if the message from the communications network is not received within the predefined duration.

13. The media of claim 9, wherein communicating authentication information comprises communicating a user-provided password, the user-provided password being provided upon the mobile device presenting a prompt.

14. The media of claim 9, wherein communicating authentication information comprises communicating biometric data, the biometric data being collected by a mobile device configured with a biometric-recording mechanism.

* * * * *